US011509596B2

(12) United States Patent
Balakrishnan et al.

(10) Patent No.: US 11,509,596 B2
(45) Date of Patent: Nov. 22, 2022

(54) THROTTLING QUEUE FOR A REQUEST SCHEDULING AND PROCESSING SYSTEM (71) Applicant: MICROSOFT TECHNOLOGY LICENSING, LLC, Redmond, WA (US)

(72) Inventors: Venkates Paramasivam Balakrishnan, Redmond, WA (US); Krishnan Varadarajan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 16/908,091

(22) Filed: Jun. 22, 2020

(65) Prior Publication Data
US 2020/0322282 A1 Oct. 8, 2020

Related U.S. Application Data (63) Continuation of application No. 15/634,938, filed on Jun. 27, 2017, now Pat. No. 10,728,166.

(51) Int. Cl.
*H04L 47/6275* (2022.01)
*H04L 67/10* (2022.01)
*H04L 47/80* (2022.01)
*H04L 47/625* (2022.01)
*H04L 47/70* (2022.01)
(Continued)

(52) U.S. Cl.
CPC ........ *H04L 47/6275* (2013.01); *H04L 47/621* (2013.01); *H04L 47/627* (2013.01); *H04L 47/805* (2013.01); *H04L 47/822* (2013.01); *H04L 67/10* (2013.01); *H04L 67/61* (2022.05)

(58) Field of Classification Search
CPC . H04L 47/6275; H04L 47/621; H04L 47/627; H04L 47/805; H04L 47/822; H04L 67/10; H04L 67/322
See application file for complete search history.

(56) References Cited

U.S. PATENT DOCUMENTS 8,924,981 B1 * 12/2014 Brown ................. G06F 9/4881
709/225
8,966,493 B1 * 2/2015 Richards ............... G06F 9/4887
718/104

(Continued)

Primary Examiner — Jonathan A Bui
Assistant Examiner — Kidest Mendaye
(74) Attorney, Agent, or Firm — Workman Nydegger (57) ABSTRACT Various methods and systems for implementing request scheduling and processing in a multi-tenant distributed computing environment are provided. Requests to utilize system resources in the distributed computing environment are stored in account queues corresponding to tenant accounts. If storing a request in an account queue would exceed a throttling threshold such as a limit on the number of requests stored per account, the request is dropped to a throttling queue. A scheduler prioritizes processing requests stored in the processing queue before processing requests stored in the account queues. The account queues can be drained using dominant resource scheduling. In some embodiments, a request is not picked up from an account queue if processing the request would exceed a predefined hard limit on system resource utilization for the corresponding tenant account. In some embodiments, the hard limit is defined as a percentage of threads the system has to process requests.

20 Claims, 8 Drawing Sheets (51) Int. Cl.
    *H04L 47/62*      (2022.01)
    *H04L 67/61*      (2022.01)

(56) References Cited

U.S. PATENT DOCUMENTS

| | | | |
|---|---|---|---|
| 2015/0055468 A1* | 2/2015 | Agarwal | H04L 49/9047 370/232 |
| 2016/0139952 A1* | 5/2016 | Geng | G06F 9/5072 718/103 |
| 2017/0063989 A1* | 3/2017 | Langouev | G06F 9/546 |

* cited by examiner

THROTTLING QUEUE FOR A REQUEST SCHEDULING AND PROCESSING SYSTEM

CROSS-REFERENCE TO RELATED APPLICATIONS

This application is a continuation of U.S. application Ser. No. 15/634,938, filed Jun. 27, 2017, titled "Throttling Queue For A Request Scheduling And Processing System," the contents of which are hereby incorporated by reference in their entirety.

BACKGROUND

The invention relates to message (e.g., request) queueing and processing. Generally, a computing environment such as a distributed computing environment can receive various types of requests to utilize system resources of the distributed computing environment. The number of incoming requests can be significant, particularly in multi-user environments such as a distributed computing environment where multiple tenants generate requests for cloud-based resources (e.g., compute, storage, data management, etc.). When the number of requests is large, processing the requests can consume all of a particular system resource. In this case, the incoming requests are often placed in a queue, and requests are processed from the queue generally on a first-in-first-out (FIFO) basis.

SUMMARY

Embodiments described herein provide methods and systems for request scheduling and processing using a throttling queue. Systems and methods for scheduling and processing requests in a distributed computing environment are provided. At a high level, account queues are populated with requests to utilize one or more system resources in a distributed computing environment. The requests are stored in account queues corresponding to tenant accounts of the distributed computing environment. If storing a request in an account queue would exceed a throttling threshold such as an account queue request capacity or an overall system request capacity, the request is dropped to a throttling queue. Requests stored in the throttling queue are prioritized for processing before requests stored in the account queues. Account queues can be prioritized using dominant resource scheduling. In some embodiments, a scheduler will not pick up a request stored in an account queue if processing the request would exceed a defined hard limit on resource utilization for the corresponding tenant account. For example, the hard limit on resource utilization can be a limit on threads processing requests for the corresponding tenant account. The hard limit on resource usage can exclude resources utilized to process requests from the throttling queue. In some embodiments, a pre-processing queue can be populated with incoming requests, and draining the pre-processing queue can be prioritized before processing requests from the throttling queue.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Queued messages (e.g., requests) can be assigned to computing resources in various ways. This process is called scheduling. When requests from multiple queues compete for the same resources, scheduling algorithms can have a critical impact on system availability and user-perceived latency. In the context of a distributed computing environment, the incoming requests can be various types of requests such as compute or storage requests, and can originate from any number of tenants and/or computing resources. For example, a multiple tenant service may store data for multiple customers (tenants) on a common node (e.g., partitions of data assigned to one particular server) in the distributed computing environment. Each tenant can therefore have access to a common node and may send, for example, read or write requests that get routed through the distributed computing environment to the node. It is therefore desirable to avoid the situation where one user has an unfair advantage in reading or writing data. More specifically, no one tenant account should be able to overwhelm the system with requests or consume more than its fair share of system resources.

Systems that seek to process requests from multiple users should seek to ensure fair request scheduling. For example, a scheduling regime could be designed to manage access to scarce computing resources such that users receive some pre-defined (fair) allocation of available resources to transfer, store and process their requests. Resources can be physical (e.g., CPU, memory, bandwidth) or virtual (e.g., threads). Moreover, requests can be non-homogeneous in terms of the unit of work they require, which can vary based on factors such as the type of request, the resource accessed, etc. In this sense, it is desirable to design a regime that ensures fair scheduling of non-homogenous requests from multiple tenants across multiple resources.

In conventional multi-tenant systems, when a request arrives, it is inspected to determine the account from which it was generated (i.e., a tenant account) and a service type (e.g., blob, table, queue, etc.) to locate a corresponding account/service queue to place the request. Worker threads from a thread pool can be spawned to process incoming requests. For each request, a new worker thread can be woken up to process the request, where each worker attempts to pick up a request from one of the queues based on a scheduling algorithm. In most cases, the worker thread that picked up the request is responsible for sending back the response to the request.

Conventional methods for request scheduling and processing have several shortcomings. For example, conventional techniques for ensuring fairness across multiple accounts include the use of FairQueue and SmartQueue/ Deficit Round Robin algorithms. With FairQueue, a request is picked up from each account queue in a round-robin fashion. Within a queue, each request is processed in a FIFO fashion. This can provide fairness in terms of the number of requests processed, but when requests are non-homogeneous, the resource consumption across account queues can vary significantly. By itself, such an algorithm fails to provide fairness in terms of overall resource usage. With SmartQueue/Deficit Round Robin, each queue is charged based on its resource usage. A worker thread gives back a constant credit to each queue, and the queue with a positive credit would get picked up. For example, a request from a queue with a high CPU usage will get picked up less often than a queue with a lower CPU usage. By itself, such an algorithm can provide fairness in terms of the usage of a single resource such as CPU, but fails to provide fairness across multiple resources. Every request consumes multiple resources for its processing (e.g., CPU, thread, memory, IO, locks), and the amount of consumption of these resources can vary across different queues.

As an additional consideration, in conventional systems, every incoming request can signal to spawn a new worker thread. When there is a surge of incoming requests for a particular queue, many or all the worker threads from a thread pool could get spawned such that only the requests from that queue get processed, effectively starving resources available for other queues when corresponding requests arrive. In some circumstances, most or all of the thread pool can be assigned to a single queue (e.g., a single tenant account), reducing the availability of system resources for other accounts.

Similarly, conventional methods for allocating resources based solely on a forecast of the processing time required for a particular request can likewise lead to suboptimal results. In conventional systems, each request can be inserted into a queue based on its [AccountName, ServiceType]. Within those queues, each request can be of a different type (CommandType). The resource consumption for each CommandType can vary significantly, so averaging them may not represent the usage of that queue correctly. Several requests taking 1 ms mingled with requests taking 100 ms could result in a perceived average processing time for that queue. However, if multiple 100 ms requests run in parallel, they would consume significantly more resources than the perceived average consumption, starving other requests of resources. Similarly, resource consumption for similar requests can vary widely at different points in time. A scan that took 10 ms at one time can end up taking several more milliseconds at a later time, depending on the nature of the request, accumulation of garbage, periodicity of background jobs, etc. Thus, the historical usage of a request does not necessary lead to predictability in resource consumption. This unpredictability can complicate the scheduling decision.

Additional shortcomings exist in terms of admission control for incoming requests. In conventional systems, the decision to process or drop/throttle a request happens only after a request gets picked up from a queue. As used herein, a dropped request refers to a request that is diverted from an intended workflow (e.g., a request can be dropped from a queue). Throttling as used herein refers to the process of limiting the rate of incoming requests (e.g., by dropping a percentage of incoming requests from a surging account). When a surge of incoming requests occurs for a particular queue and the scheduler decides not a pick up a request from the queue, that queue can build up quickly. If the queue cannot be drained fast enough, the node (e.g., table server) could become overwhelmed, at which point all requests at the node can be dropped. This can lead to dropping/throttling requests from innocent accounts.

Other variations and combinations of shortcomings exist with conventional methods for request scheduling and processing. As such, processes to support efficient request scheduling of non-homogeneous requests from multiple tenants are integral to the deployment of computing services such as distributed computing services.

At a high level, the request scheduling and processing system supports a mechanism for scheduling and processing incoming requests in a multi-tenant distributed computing environment. Embodiments described herein provide simple and efficient methods and systems for request scheduling and processing that utilize a throttling queue. In order to protect a node (e.g., table server) from a surge of incoming requests and to minimize impacts on the availability of computing resources to innocent accounts (e.g., accounts that have a stable request rate), requests from the surging account should be handled fast enough to avoid consuming all or most of the node's resources. In this manner, requests headed for an account queue for a surging account can be redirected to a separate throttling queue based on defined throttling thresholds. For example, an account queue capacity can be defined (e.g., 1000 requests), above which incoming requests to that queue will be dropped to the throttling queue. Additionally and/or alternatively, an overall system request capacity can be defined across all accounts (e.g., 10,000 requests), above which any incoming requests will be directed to the throttling queue. These throttling limits can be designed to account for limitations on system resources (e.g., the system may run out of memory if more than a certain number of requests are accepted). Requests in the throttling queue can be scheduled for processing with a high priority (e.g., higher than other queues such as account queues) to reduce the risk of overwhelming the node. More specifically, by dropping surging requests to the throttling queue, these requests can be redirected quickly to avoid or reduce negative impacts on requests from innocent accounts such as dropped/throttled requests. In this manner, the throttling queue acts like a relief valve for the node, preventing a surge of requests from overwhelming the node and providing an improved experience for innocent accounts.

When operating in a multi-tenant environment with multiple account queues, a scheduling algorithm determines the order in which account queues are drained. The request scheduling and processing system can use any number of scheduling queuing fairness algorithms, including by way of nonlimiting example FairQueue, SmartQueue and Deficit Round Robin. Another possible scheduling queuing fairness algorithm is dominant resource scheduling (e.g., Dominant Resources Fairness, Multi Resource Fair Queueing), which attempts to provide fairness across multiple resources. In embodiments that use dominant resource scheduling, requests are scheduled based on a determination of which queue has the least dominant share. A queue's dominant resource is the resource for which the queue has the highest consumption, and a queue's dominant share is that queue's percent usage of the system's corresponding resource. The queue with the least dominant share is the queue with a dominant share of resource usage that is lower than any other queue's dominant share of resource usage.

For example, assume a node has max CPU=100 and Memory=100, and that queueName(X,Y) represents the CPU (X) usage and memory usage(Y) required to process a request in that queue. Further assume there are two queues A(10, 5), B(3, 7). With no requests in progress, assume a request from queue A gets scheduled. At this time, its resource usage share would be (10/100, 5/100). A's dominant resource is CPU with a dominant share of 10/100, and queue B's resource share is (0/100, 0/100). Because B's dominant share (both CPU and memory) is lower than A's dominant share, B has the least dominant share, so a request from B gets scheduled next. B's resulting resource usage share is now (3/100, 7/100). The dominant resource for B is now memory with share 7/100. Because B's dominant share (memory) is still less than A's dominant share (CPU usage 10/10), B again has the least dominant share, and the scheduler will again schedule a request from B, increasing its resource usage share to (6/100, 14/100), and so on. For additional detail regarding dominant resource fairness, see Ghodsi, A., Zaharia, M., et al., *Dominant Resource Fairness: Fair Allocation of Multiple Resource Types*, University of California, Berkeley 2011; Ghodsi, A., Sekar, V. et al., *Multi-Resource Fair Queueing for Packet Processing*, SIGCOMM, 2012; and Mace, J., Bodik, P., et al., 2*DFQ: Two-Dimensional Fair Queueing for Multi-Tenant Cloud Services*, SIGCOMM, 2016, each of which is herein incorporated by reference. By utilizing dominant resource fairness-based scheduling, the request scheduling and processing system can achieve a measure of multi-resource fairness.

In some embodiments, the request scheduling and processing system can limit the resources consumed by an account so a surge of requests from that account or resource-demanding requests do not consume all available resources and/or overwhelm the node (e.g., table server). This is in contrast to conventional systems in which requests are processed when there are enough resources to process them. Because requests do not execute at predictable rates and can take different amounts of time to process, providing defined hard limits can prevent an account from taking over all available resources. More specifically, defined hard limits on resource usage can be placed on an account. For example, an account may be limited to a certain percentage (e.g., 50% or 70%) of available node resources, whether physical or virtual. In preferred embodiments, the hard limits are limits on the number of threads that can be assigned to process requests generated by a given account. In this manner, threads can be used as a surrogate for the usage of other system resources because the thread itself is a finite resource that can be exhausted and use of a thread requires use of other system resources (e.g., CPU, network, etc.). By way of nonlimiting example, assume a system in a multi-tenant environment has a 100 thread capacity and one account is using all 100 threads. If each thread takes a long time to process a corresponding request, this allocation of resources may lead to unwanted throttling/dropping requests from innocent accounts. Thus, the system can impose a limit on the threads that can be assigned to a particular account to ensure resource availability for other accounts.

Generally, the request scheduling and processing system makes a determination of whether processing a request would exceed a hard limit for an account based on the account's current resource utilization and the expected utilization if the request was processed. If it is determined that processing the request would exceed a defined hard limit for the account, various corrective measures can be undertaken to prevent additional resource consumption. In preferred embodiments, the request at issue is simply not picked up. This is in contrast to proactively throttling the account, which would likely lead to dropped requests. By not picking up such a request until resource utilization for the account drops, at least some users in a multi-user environment will experience fewer dropped requests. For example, where incoming requests from an account occur in bursts and a fraction of those requests is resource intensive (e.g., requiring a significant amount of CPU, triggering a hard limit), subsequent requests from that account can continue to populate the account's queue without being dropped. Requests simply will not be picked up for processing until the account's resource utilization drops below the hard limit. In this scenario, the account may experience latency instead of dropped requests, which would force the account to undertake a retry process (e.g., resending the dropped requests). Of course, in some embodiments, throttling may be performed in response to an expected hard limit breach. In this manner, the use of hard limits can improve the availability of system resources for innocent accounts by preventing a single account from consuming more than a defined amount of system resources.

In preferred embodiments, for the purposes of hard limit determinations, the request scheduling and processing system does not charge the computing resources utilized to process requests from the throttling queue to tenant accounts. More specifically, it may be desirable to prioritize purging the throttling queue to reduce the risk of running out of system resources (e.g., memory). In this manner, minimizing the constraints placed on processing requests from the throttling queue can improve system performance for innocent accounts by preventing some instances of dropped requests/throttling.

In some embodiments, the request scheduling and processing system can provide feedback to a user and/or upstream system component(s) to indicate the occurrence (or expected or planned occurrence) of dropped requests and/or throttling. By way of nonlimiting example, such feedback may occur when incoming requests are dropped to the throttling queue due to queue capacity issues, when processing a request is expected to exceed one or more hard limits for an account, and the like. The feedback can inform a user or upstream system component(s), e.g., to reduce the rate of requests sent or to stop sending requests altogether. The feedback can be specific to a particular account (e.g., a surging account). For example, a node (e.g., table server). Additionally and/or alternatively, the request scheduling and processing system can provide feedback to an upstream component (e.g., front end) to probabilistically drop a percentage (e.g., 20%) of a surging account's requests to avoid overloading the node. Similarly, the node can direct a notification to the corresponding user that the designated percentage of incoming requests will be dropped. In this way, the system can elevate potential issues for upstream resolution.

The request scheduling and processing system can include a pre-preprocessing queue to store incoming requests before allocation into an account queue or the throttling queue. For example, upon receiving each incoming request, a node (e.g., table server) can populate the request in a preprocessing queue and wake up a thread to direct a request from the preprocessing queue to an appropriate queue. For example, requests can be allocated from the preprocessing queue to an appropriate queue (e.g., an account or throttling queue) using the techniques described herein. In embodiments, draining the preprocessing queue is prioritized before processing requests from any other queue. For example, each worker thread before starting to process a request can first drain the preprocessing queue by determining the account that generated the request (e.g., via the request header). Any throttling thresholds (e.g., an account queue capacity, overall system request capacity, etc.) are checked before adding the request to the corresponding AccountName/ServiceType queue. If the request would exceed one of the throttling thresholds, it is added to the throttling queue. Between the throttling queue and account queues, worker threads can prioritize draining the throttling queue. Of course, various other techniques, algorithms and heuristics for queue prioritization are contemplated within the present disclosure.

As such, scheduling and processing incoming requests in a multi-tenant distributed computing environment can be achieved by using a throttling queue populated based on account and/or system throttling thresholds, by using predefined hard limits for account usage of system resources and by determining not to pick up requests from account queues that exceed one or more hard limits.

Figure 1:
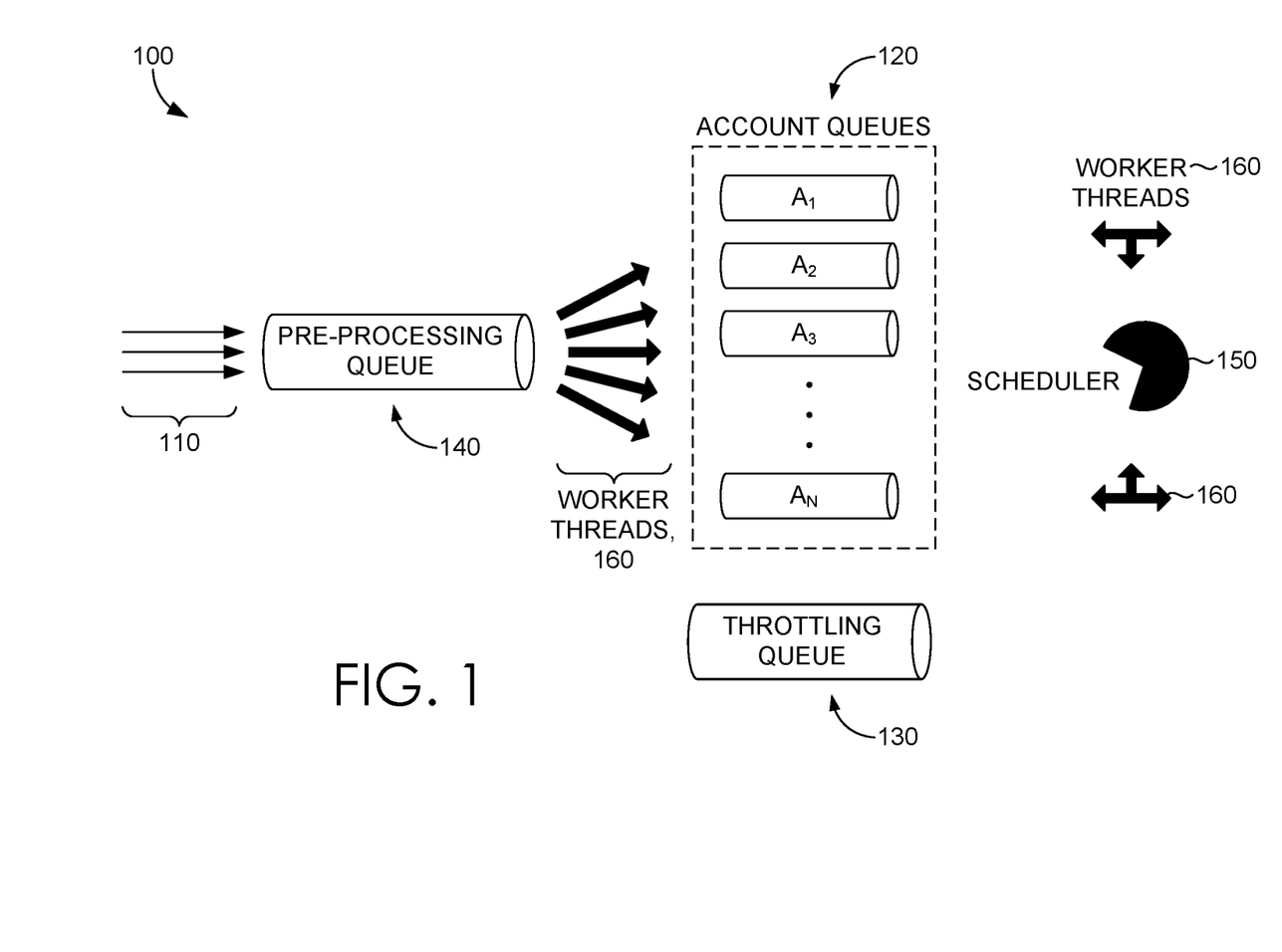
FIG. 1 is a block diagram of an exemplary request scheduling and processing system, in accordance with embodiments described herein.

With reference to FIG. 1, embodiments of the present disclosure can be discussed with reference to an exemplary distributed computing environment (e.g., exemplary distributed computing environment 700 in FIG. 7 and/or exemplary distributed computing environment 800 in FIG. 8) that serves as an operating environment for implementing the functionality described herein, for example, with respect to request scheduling and processing system 100. A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Request scheduling and processing system 100 includes scheduler 150, account queues 120 (e.g., $A_1, A_2, A_3 \ldots A_n$) and throttling queue 130. Generally, scheduler 150 has access to a thread pool and assigns worker threads 160 from the thread pool to process requests queued in account queues 120 and throttling queue 130. In some embodiments, request scheduling and processing system 100 includes pre-processing queue 140. In these embodiments, threads 110 populate pre-processing queue 140 with incoming requests, and worker threads 160 drain pre-processing queue 140 by allocating queued requests to a corresponding one of account queues 120 or throttling queue 130. Threads 110 may (but need not) come from a different thread pool than worker threads 160 (e.g., to minimize the work threads 110 need to perform). Similarly, worker threads 160 are depicted in FIG. 1 as draining pre-processing queue 140 as well as account queues 120 and throttling queue 130. However, this need not be the case, and in some embodiments, various other combinations of thread pools can be utilized to perform the various functions described herein.

In the embodiment depicted in FIG. 1, worker threads 160 allocate requests to an appropriate one of account queues 120 or throttling queue 130. Generally, each tenant account is assigned its own account queue, and worker threads 160 implement one or more throttling limits. For example, each account can include a limit on the number of queued requests. Similarly, request scheduling and processing system 100 can include a limit on the number of total queued requests across all accounts. The throttling limits can but need not take into account requests that are in process. For example, when a queued request is selected for processing, the request can be designated as such to avoid getting picked up by another worker thread. In this manner, requests being processed may actually remain in a queue (e.g., so that if the worker thread processing the request crashes before the request is completed, the state of the request can be toggled so it can be picked up by another worker thread). Similarly, in some embodiments, throttling thresholds can count queued requests that are in process toward the thresholds. Generally once a throttling threshold is breached, worker threads 160 populate throttling queue 130 instead of a corresponding one of account queues 120. For example, if a worker thread determines that allocating a request from the account assigned to account queue $A_1$ would result in a breached throttling threshold, the worker thread instead directs the request to throttling queue 130.

Generally, worker threads 160 are assigned by scheduler 150 to prioritize processing requests from throttling queue 130 over processing requests from account queues 120. In embodiments that include pre-processing queue 140, scheduling and processing system 100 prioritizes draining pre-processing queue 140 over processing requests queued in throttling queue 130 and account queues 120. In this way, pre-processing queue 140 has a first priority, throttling queue 130 has a second priority and account queues 120 have a third priority. Further, when worker threads 160 serve to process requests from account queues 120, worker threads 160 are assigned by scheduler 150 to prioritize processing requests from accounts using a scheduling queuing fairness algorithm (e.g., FairQueue, SmartQueue, Deficit Round Robin, Dominant Resources Fairness, Multi Resource Fair Queueing, etc.).

Figure 2:
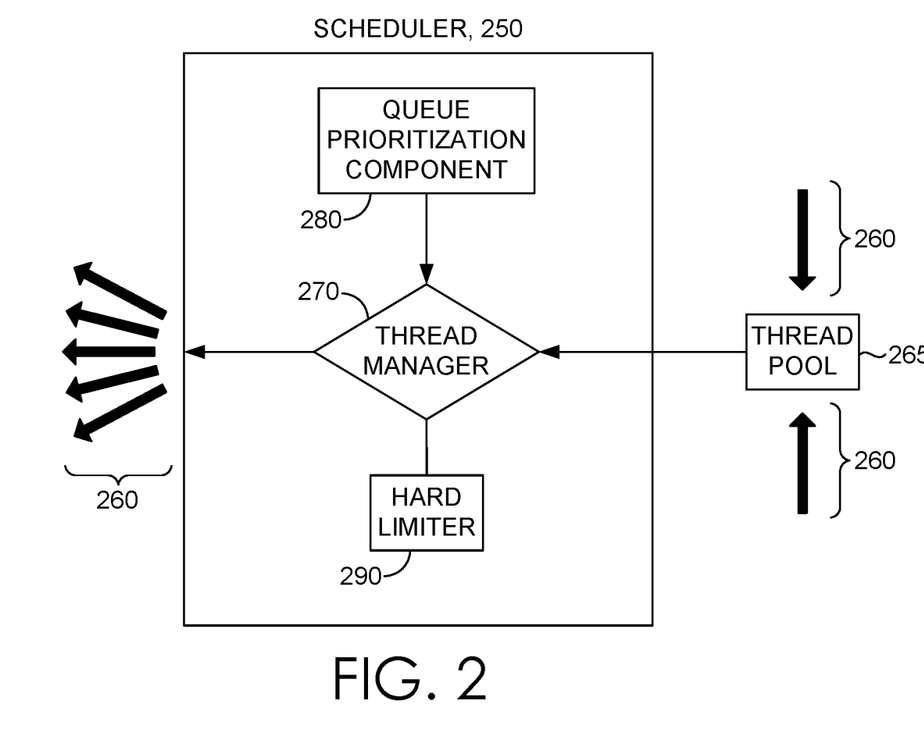
FIG. 2 is a block diagram of an exemplary scheduler, in accordance with embodiments described herein.

FIG. 2 depicts exemplary scheduler 250 in accordance with certain embodiments. Scheduler 250 includes thread manager 270, queue prioritization component 280 and hard limiter 290. Scheduler 250 has access to worker threads 260 via thread pool 265. Thread manager 270 accesses a worker thread from thread pool 265 and allocates the worker thread to perform the functions described herein according to a queue prioritization scheme. In the embodiment depicted in FIG. 2, the queue prioritization scheme is implemented via queue prioritization component 280. For example, queue prioritization component 280 can prioritize draining the pre-processing queue (in embodiments with a pre-processing queue), then prioritize processing requests queued in the throttling queue, then prioritize processing requests queued in an account queue selected using a scheduling queuing fairness algorithm. The queue prioritization scheme can be revisited (e.g., recalculated) as needed. For example, each time a worker thread is to be assigned to process a request from an account queue, queue prioritization component 280 can prioritize an account using the selected scheduling queuing fairness algorithm. As such, thread manager 270 accesses an available thread from thread pool 265, accesses a queue prioritization scheme via queue prioritization component 280 and assigns worker threads based on the queue prioritization scheme.

In embodiments that include hard limits, thread manager 270 can access hard limiter 290 (e.g., directly, via queue prioritization component 280, or otherwise) to determine whether processing a request from a particular account queue will breach a hard limit. In this manner, hard limiter 290 can impose one or more hard limits on accounts. By way of nonlimiting example, hard limiter 290 can limit an account to 70% of available node resources (whether physical or virtual). In preferred embodiments, hard limits are defined in terms of threads currently processing requests (e.g., no one account can utilize more than 70% of the total worker threads in the request scheduling and processing system at a given time). Generally, hard limiter 290 accesses or otherwise determines usage of a defined node resource for a given account, determines what the usage would be if a worker thread was assigned to process a request for that account, accesses a defined hard limit and compares the expected resource usage against the hard limit to determine whether a hard limit would be breached.

In the embodiment depicted in FIG. 2, thread manager 270 accesses the queue prioritization scheme via queue prioritization component 280 to determine a prioritized queue. When the prioritized queue is an account queue, thread manager accesses hard limiter 290 to determine whether assigning the next worker thread to that account queue would violate a defined hard limit. If so, thread manager 270 may look to the next prioritized account queue and determine (e.g., via hard limiter 290) whether assigning the next worker thread to that account queue would violate a defined hard limit, and so on. Additionally and/or alternatively, queue prioritization component 280 can access hard limiter 290 to incorporate the hard limit determination into the queue prioritization scheme such that thread manager 270 need not directly invoke a hard limit determination. In embodiments such as these, scheduler 250 responds to a hard limit breach by simply not assigning worker threads to the account that breached the limit. However, in some embodiments the system can throttle the account in addition and/or instead.

Having identified various components of the request scheduling and processing system, it is noted that any number of components may be employed to achieve the desired functionality within the scope of the present disclosure. The various components of FIG. 1 and FIG. 2 are shown with lines for the sake of conceptual clarity, and other arrangements of the described components and/or component functionality are also contemplated. For example, although some components of FIG. 1 and FIG. 2 are depicted as single components, the depictions are exemplary in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 3:
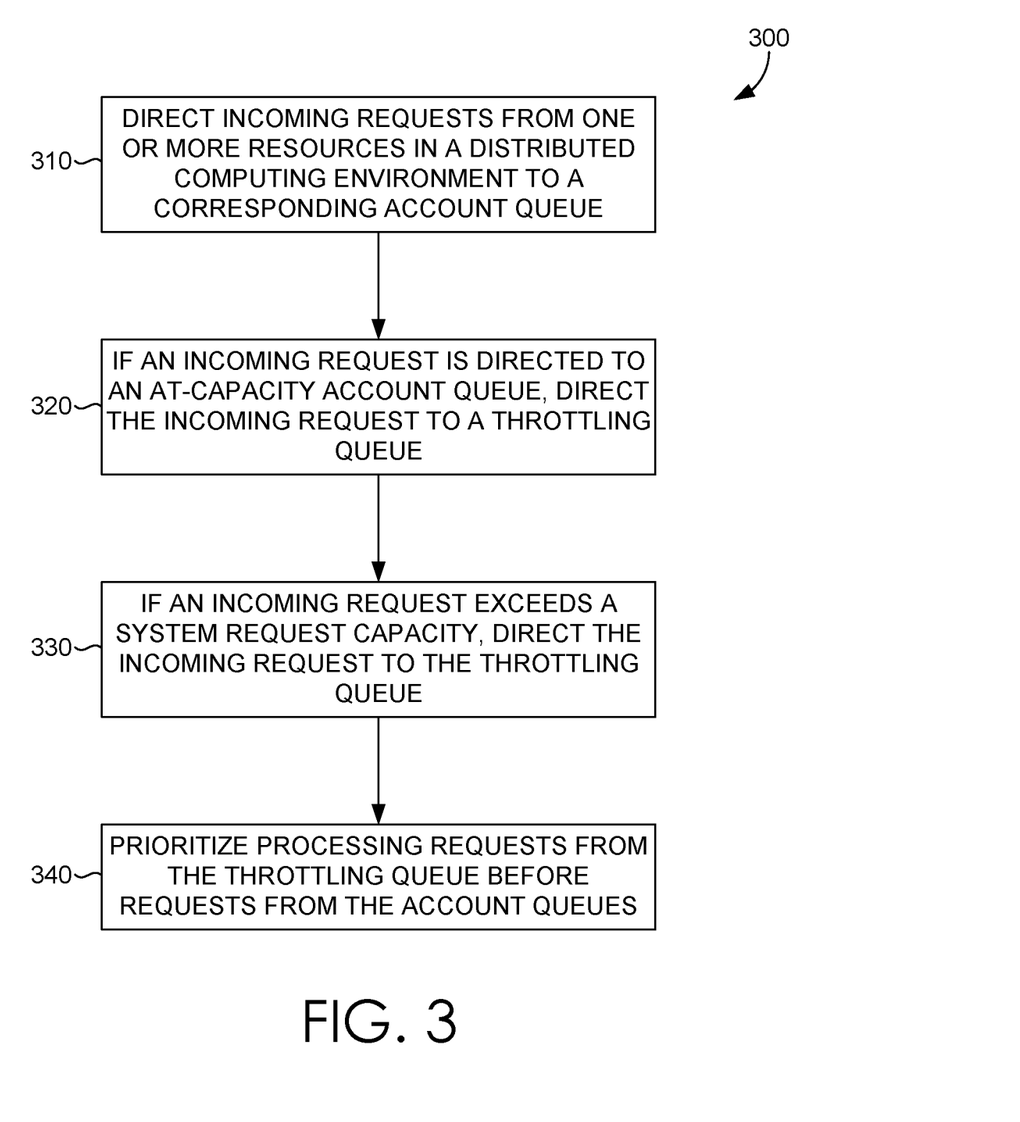
FIG. 3 is a flow diagram showing an exemplary method for providing a request scheduling and processing system using a throttling queue, in accordance with embodiments described herein.
Figure 4:
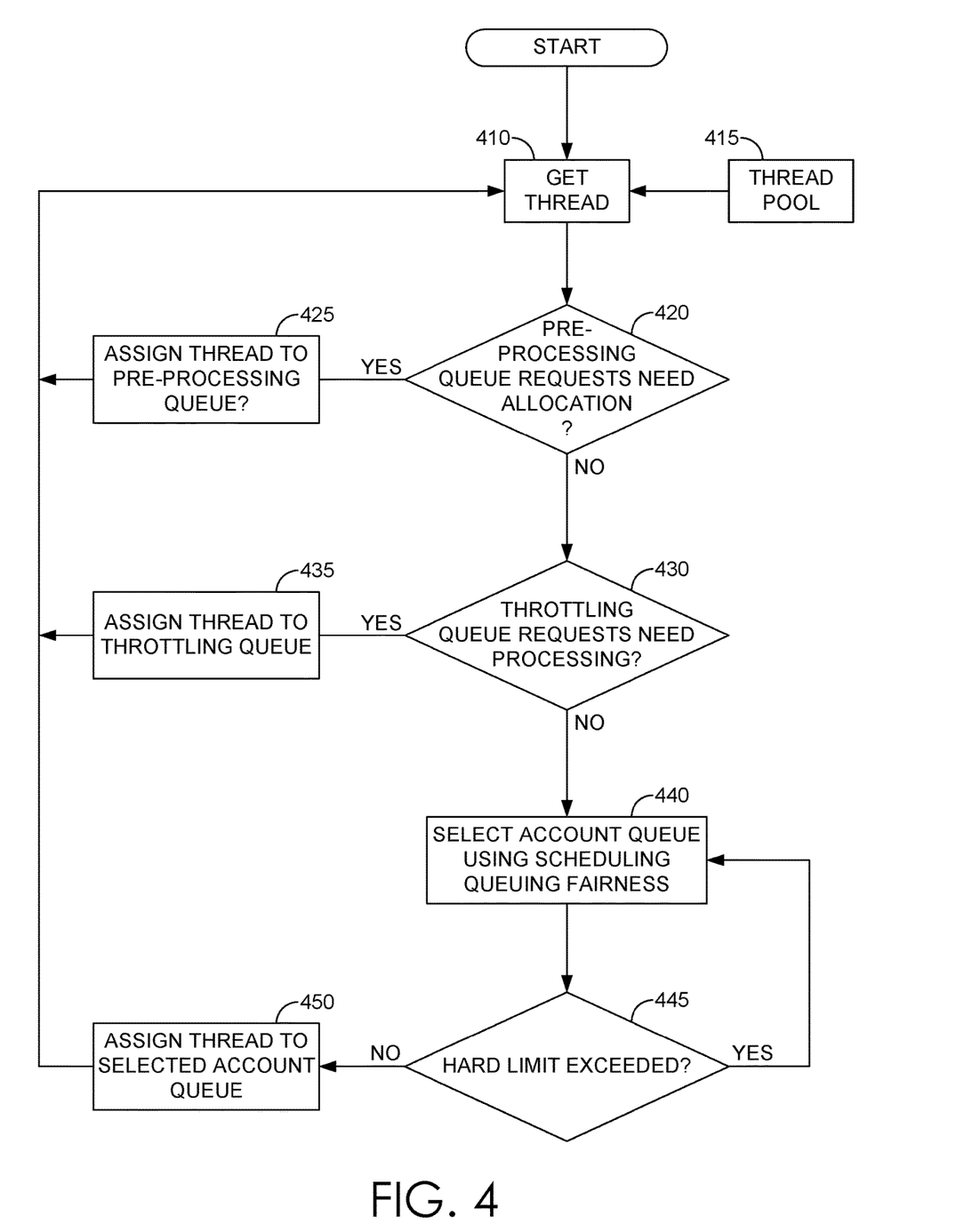
FIG. 4 is a flow diagram showing an exemplary method for providing a request scheduling and processing system using a throttling queue, in accordance with embodiments described herein.
Figure 5:
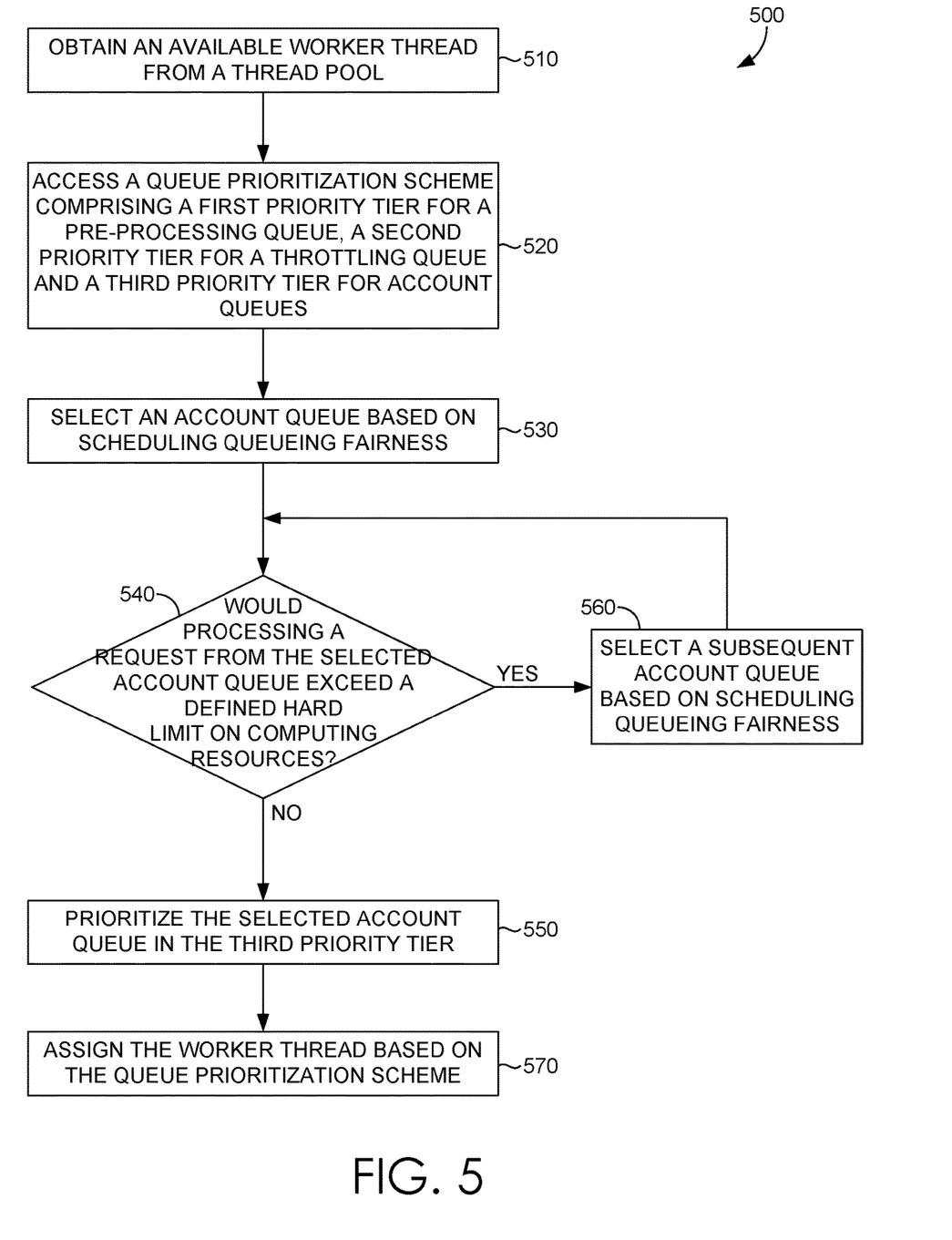
FIG. 5 is a flow diagram showing an exemplary method for providing a request scheduling and processing system using a throttling queue, in accordance with embodiments described herein.

With reference to FIGS. 3-5, flow diagrams are provided illustrating methods for request scheduling and processing. The methods can be performed using the request scheduling and processing system described herein. In embodiments, one or more computer storage media having computer-executable instructions embodied thereon can, when executed by one or more processors, cause the one or more processors to perform the methods in the request scheduling and processing system.

Turning now to FIG. 3, a flow diagram is provided that illustrates a method 300 for request scheduling and processing using a throttling queue. The method 300 can be performed using the request scheduling and processing system described herein. In particular, one or more computer storage media having computer-executable instructions embodied thereon can, when executed by one or more processors, cause the one or more processors to perform the method 300. Generally, each tenant of a distributed computing environment may be assigned a corresponding account queue. At block 310, an incoming request from one or more resources in the distributed computing environment is directed to an account queue corresponding to the request. For example, each incoming request can be inspected to determine the account that generated the request (or that otherwise should be charged with the request) to identify a corresponding account queue. At block 320, it is determined whether allocating an incoming request to a corresponding account queue would exceed that queue's request capacity. If so, the incoming request is directed to a throttling queue. At block 330, it is determined whether allocating an incoming request would exceed an overall system request capacity. If so, the request is directed to the throttling queue. If allocating an incoming request would neither exceed an account queue's request capacity nor exceed the system's overall request capacity, the incoming request is stored in the corresponding account queue. At block 340, requests from the throttling queue are prioritized for processing before requests from the account queues.

Turning now to FIG. 4, a flow diagram is provided that illustrates a method 400 for request scheduling and processing using a pre-processing queue and a throttling queue. The method 400 can be performed using the request scheduling and processing system described herein. Initially at block 410, a thread is obtained from thread pool 415. In embodiments that include a pre-processing queue such as that depicted in FIG. 4, draining the pre-processing queue is generally prioritized. As such, it is determined at block 420 whether there are any requests stored in a pre-processing queue that need allocation to a corresponding account or throttling queue. If there are, the obtained thread is assigned to the pre-processing queue at block 425. If there are no requests in the pre-processing queue that need allocation, a determination is then made at block 430 whether there are any requests stored in a throttling queue that need processing. If so, the obtained request is assigned to process a request from the throttling queue at block 435. Finally, if there are no requests in the throttling queue that need processing, an account queue is selected at block 440 using scheduling queueing fairness. A determination is made at block 445 whether processing a request from the selected account queue would exceed a hard limit. If a hard limit would be exceeded, the process returns to block 440 to select the next prioritized account queue. When it is determined that processing a request from the selected account queue would not exceed a hard limit, the obtained thread is assigned at block 450 to process a request from the selected account queue.

Turning now to FIG. 5, a flow diagram is provided that illustrates a method 500 for request scheduling and processing using a pre-processing queue and a throttling queue. The method 500 can be performed using the request scheduling and processing system described herein. Initially at block 510, an available worker thread is obtained from a thread pool. At block 520, a queue prioritization scheme is accessed, the queue prioritization scheme comprising a first priority tier for a pre-processing queue, a second priority tier for a throttling queue and a third priority tier for account queues. Within the third priority tier, an account queue is selected for priority at block 530 based on scheduling queue fairness. At block 540, it is determined whether processing a request from the selected account queue would exceed a defined hard limit on computing resources. If it would, a subsequent account queue is selected at block 560 based on scheduling queueing fairness, and the process returns to block 540. If processing a request from the selected account queue would not exceed the defined hard limit on computing resources, at block 550 the selected account queue is prioritized within the third priority tier of the queue prioritization scheme. Thus, worker threads can be assigned at block 570 based on the queue prioritization scheme.

Figure 6:
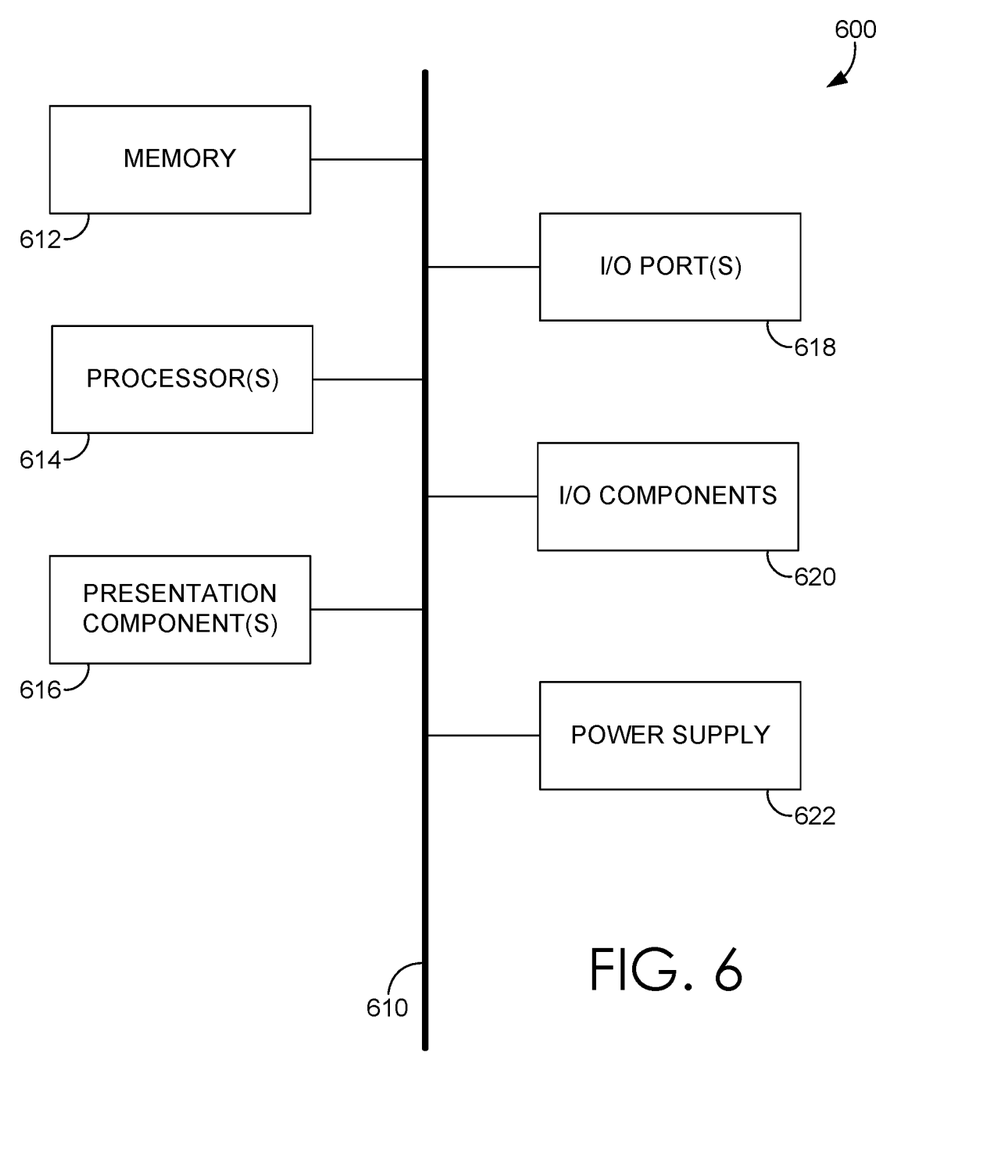
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more buses (such as an address bus, data bus, or combination thereof). The various blocks of FIG. 6 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

With reference to the request scheduling and processing system, embodiments described herein support request scheduling and processing. The request scheduling and processing system components refer to integrated components for request scheduling and processing. The integrated components refer to the hardware architecture and software framework that support request scheduling and processing functionality within the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the request scheduling and processing system functionality. Any other variations and combinations thereof are contemplated with embodiments of the present invention.

By way of example, the request scheduling and processing system can include an API library that includes specifications for routines, data structures, object classes, and variables may support the interaction between the hardware architecture of the device and the software framework of the request scheduling and processing system. These APIs include configuration specifications for the request scheduling and processing system such that the different components therein can communicate with each other, as described herein.

Figure 7:
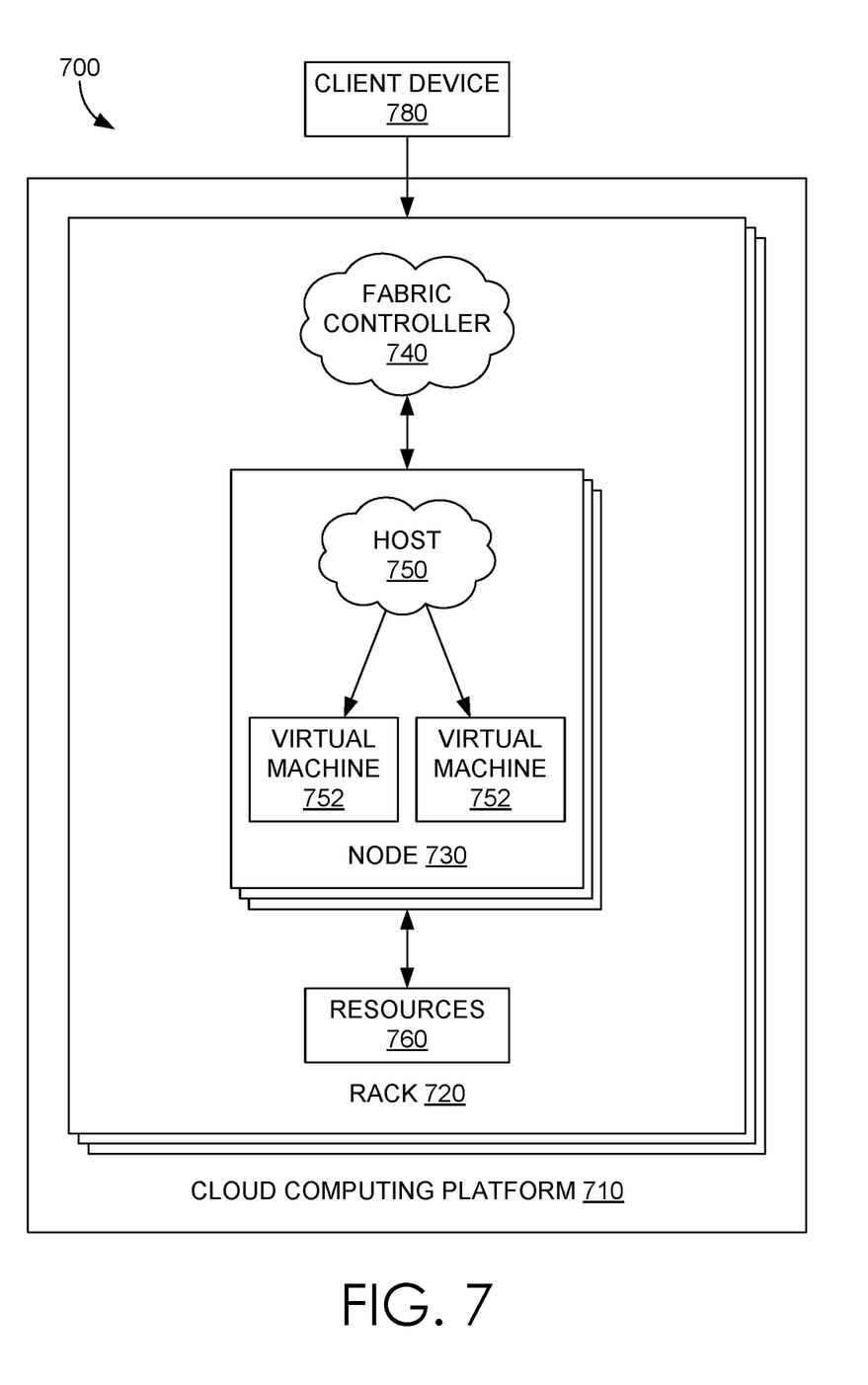
FIG. 7 is a block diagram of an exemplary computing environment suitable for use in implementing embodiments described herein.

Referring now to FIG. 7, FIG. 7 illustrates exemplary distributed computing environment 700 in which implementations of the present disclosure may be employed. In particular, FIG. 7 shows a high level architecture of the request scheduling and processing system ("system") in cloud computing platform 710, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support distributed computing environment 700 that includes cloud computing platform 710, rack 720, and node 730 (e.g., computing devices, processing units, or blades) in rack 720. The system can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example. Client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Figure 8:
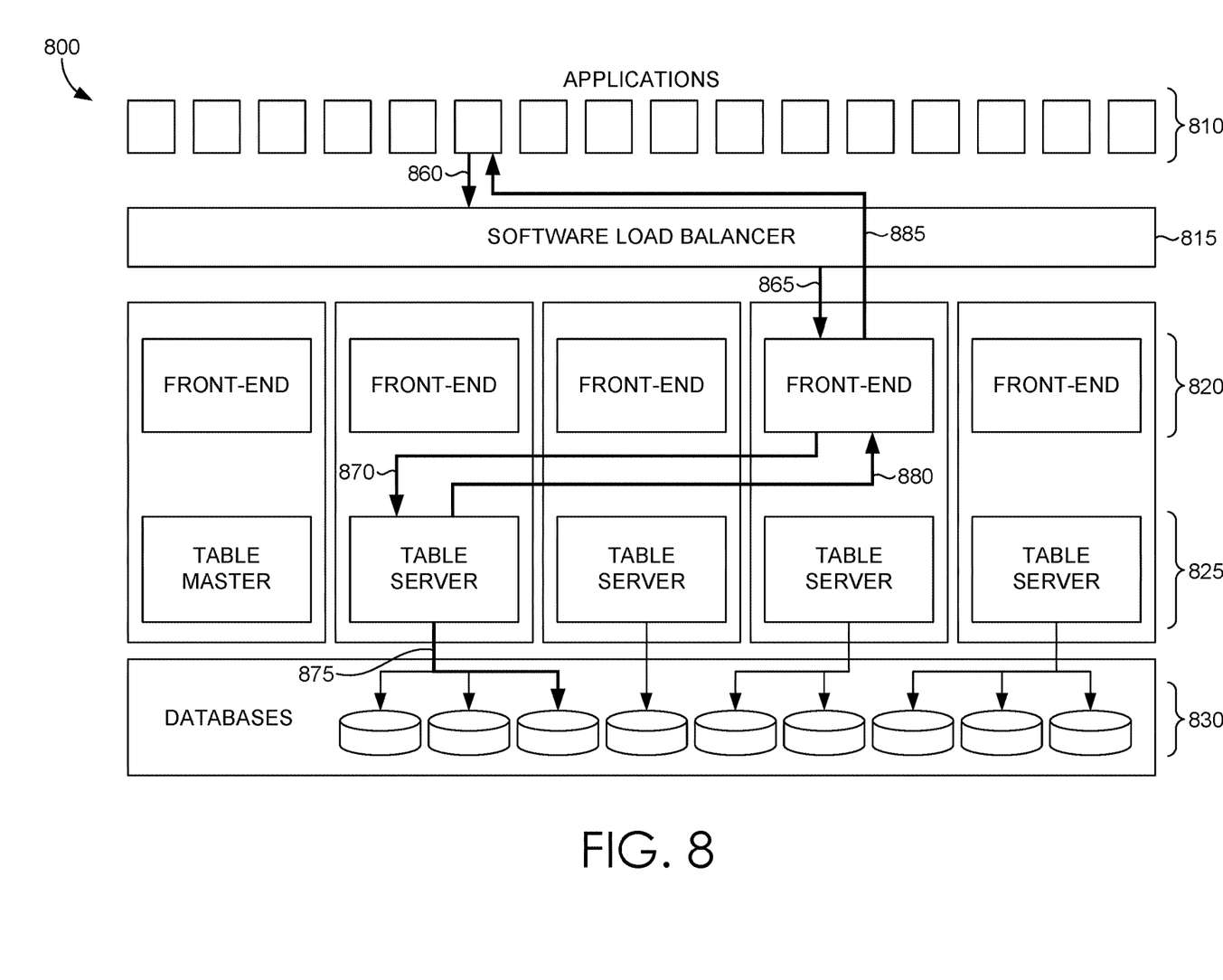
FIG. 8 is a block diagram of an exemplary computing environment suitable for use in implementing embodiments described herein.

With reference to FIG. 8, FIG. 8 illustrates exemplary distributed computing environment 800 in which implementations of the present disclosure may be employed. In this embodiment, distributed computing environment 800 includes application(s) 810, software load balancer 815, front end server(s) 820, table server(s) 825 and database(s) 830. In general, a client composes and sends an HTTP request (e.g., at 860). Software load balancer 815 directs the request (e.g., at 865) to the front end. The front end parses the request, maps the table server that is handling the requested partition and forwards the request (e.g., 870). The table server processes the request and commits the changes to the database (e.g., 875). The table server then sends a response to the front end (e.g., 880). Finally, the front end composes the HTTP response and sends the response to the client (e.g., 885).

Having described various aspects of distributed computing environment 700, cloud computing platform 710 and distributed computing environment 800, it is noted that any number of components may be employed to achieve the desired functionality within the scope of the present disclosure. The various components of FIG. 7 and FIG. 8 are shown with lines for the sake of conceptual clarity, and other arrangements of the described components and/or component functionality are also contemplated. Further, although some components of FIG. 7 and FIG. 8 are depicted as single components, the depictions are exemplary in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the request scheduling and processing system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, causes the one or more processors to perform operations comprising:
   storing, in a pre-processing queue, requests to utilize one or more resources in a distributed computing environment;
   storing, in account queues for corresponding tenant accounts of the distributed computing environment, a first set of the requests from the pre-processing queue that would not exceed a throttling threshold;
   storing, in a throttling queue, a second set of the requests from the pre-processing queue that would exceed the throttling threshold;
   assigning worker threads to prioritize processing requests from the throttling queue over the account queues; and
   causing transmission of an indication that at least one request of the second set of requests was stored in the throttling queue instead of a corresponding one of the account queues.

2. The one or more computer storage media of claim 1, the operations further comprising, upon receiving each of the requests at a node, storing the request in the pre-processing queue at the node and waking up and directing one of the worker threads to drain the pre-processing queue.

3. The one or more computer storage media of claim 1, wherein assigning the worker threads to prioritize processing the requests is based on a queue prioritization scheme comprising a first priority tier for draining the pre-processing queue, a second priority tier for processing requests stored in the throttling queue, and a third priority tier for processing requests stored in the account queues.

4. The one or more computer storage media of claim 1, wherein assigning the worker threads comprises spawning the worker threads from a common thread pool to process requests from the throttling queue and the account queues.

5. The one or more computer storage media of claim 1, the operations further comprising causing transmission of an indication of a determination not to pick up a request stored in one of the account queues based on a determination that processing the request would exceed a defined hard limit on resource usage for a corresponding one of the tenant accounts.

6. The one or more computer storage media of claim 1, wherein causing the transmission of the indication that the at least one request was stored in the throttling queue comprises an instruction to reduce a rate of requests or to stop sending requests.

7. The one or more computer storage media of claim 1, wherein causing the transmission of the indication that the at least one request was stored in the throttling queue comprises an instruction to an upstream component to probabilistically drop a percentage of future requests from a corresponding surging account of the tenant accounts.

8. The one or more computer storage media of claim 1, wherein causing the transmission of the indication that the at least one request was stored in the throttling queue comprises a notification that a percentage of future requests from a corresponding surging account of the tenant accounts will be dropped.

9. The one or more computer storage media of claim 1, wherein the worker threads are configured to prioritize processing requests from the throttling queue over the account queues by processing from the account queues only when the throttling queue is empty.

10. A method comprising:
storing, in a pre-processing queue, requests to utilize one or more resources in a distributed computing environment;
storing, in account queues for corresponding tenant accounts of the distributed computing environment, a first set of the requests from the pre-processing queue that would not exceed a throttling threshold;
dropping, to a throttling queue, a second set of the requests from the pre-processing queue that would exceed the throttling threshold;
assigning worker threads to process requests from the throttling queue and the account queues, prioritizing the throttling queue over the account queues; and
causing transmission of an indication that at least one request of the second set of requests was dropped to the throttling queue instead of stored in a corresponding one of the account queues.

11. The method of claim 10, further comprising, upon receiving each of the requests at a node, storing the request in the pre-processing queue at the node and waking up and directing a worker thread to drain the pre-processing queue.

12. The method of claim 10, wherein assigning the worker threads to process requests from the throttling queue and the account queues is based on a queue prioritization scheme comprising a first priority tier for draining the pre-processing queue, a second priority tier for processing requests stored in the throttling queue, and a third priority tier for processing requests stored in the account queues.

13. The method of claim 10, wherein assigning the worker threads comprises spawning the worker threads from a common thread pool to process requests from the throttling queue and the account queues.

14. The method of claim 10, further comprising causing transmission of an indication of a determination not to pick up a request stored in one of the account queues based on a determination that processing the request would exceed a defined hard limit on resource usage for a corresponding one of the tenant accounts.

15. The method of claim 10, wherein causing the transmission of the indication that the at least one request was dropped to the throttling queue comprises an instruction to reduce a rate of requests or to stop sending requests.

16. The method of claim 10, wherein causing the transmission of the indication that the at least one request was dropped to the throttling queue comprises an instruction to an upstream component to probabilistically drop a percentage of future requests from a corresponding surging account of the tenant accounts.

17. The method of claim 10, wherein causing the transmission of the indication that the at least one request was dropped to the throttling queue comprises a notification that a percentage of future requests from a corresponding surging account of the tenant accounts will be dropped.

18. A system comprising:
at least one processor; and
at least one memory having instructions stored thereon which, when executed by the at least one processor, cause the at least one processor to perform operations comprising:
storing, in a pre-processing queue, requests to utilize one or more resources in a distributed computing environment;
storing, in account queues for corresponding tenant accounts of the distributed computing environment, a first set of the requests from the pre-processing queue that would not exceed a throttling threshold;
redirecting a second set of the requests that would exceed the throttling threshold from the pre-processing queue to a throttling queue;
assigning worker threads to prioritize processing from the throttling queue over the account queues; and
causing transmission of an indication that at least one request of the second set of requests was redirected to the throttling queue instead of stored in a corresponding one of the account queues.

19. The system of claim 18, wherein causing the transmission of the indication that the at least one request was redirected to the throttling queue comprises an instruction to reduce a rate of requests or to stop sending requests.

20. The system of claim 18, wherein causing the transmission of the indication that the at least one request was redirected to the throttling queue comprises an instruction to an upstream component to probabilistically drop a percentage of future requests from a corresponding surging account of the tenant accounts.

* * * * *